United States Patent Office 3,210,463

Patented Oct. 5, 1965

3,210,463

STEREOSCOPIC DISPLAY SYSTEMS FOR THE PRESENTATION OF RADAR DATA

Tony Leenhardt, Paris, France, assignor to CSF-Compagnie Générale de Télégraphie Sans Fil, a corporation of France Filed Apr. 4, 1962, Ser. No. 185,145

Claims priority, application France, Apr. 11, 1961, 858,341

11 Claims. (Cl. 178—6.5)

The present invention relates to a stereoscopic representation of objects detected by a radar system supplying three co-ordinates of said objects.

The display system according to the invention utilizes a television image constituted by superposing two associated television images respectively derived from a first and a second tracing representative of the objects detected by the radar system.

The invention will be best understood from the following description and appended drawings, wherein.

Figure 2:
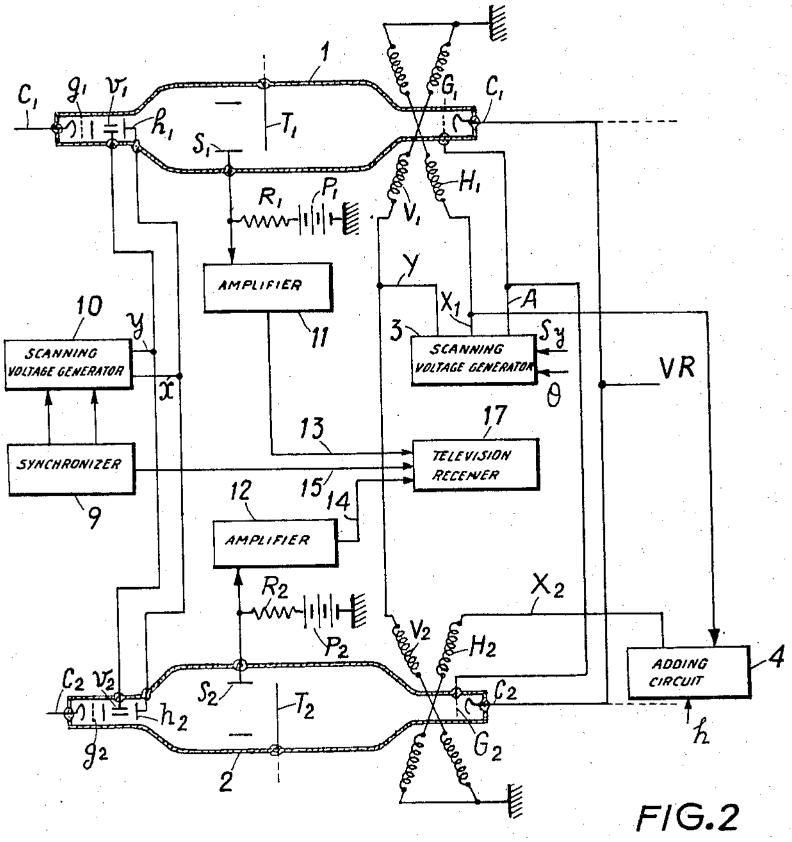
FIG. 2 is an arrangement, according to the invention, for presenting the data provided by a three-dimensional radar system.
Figure 4:
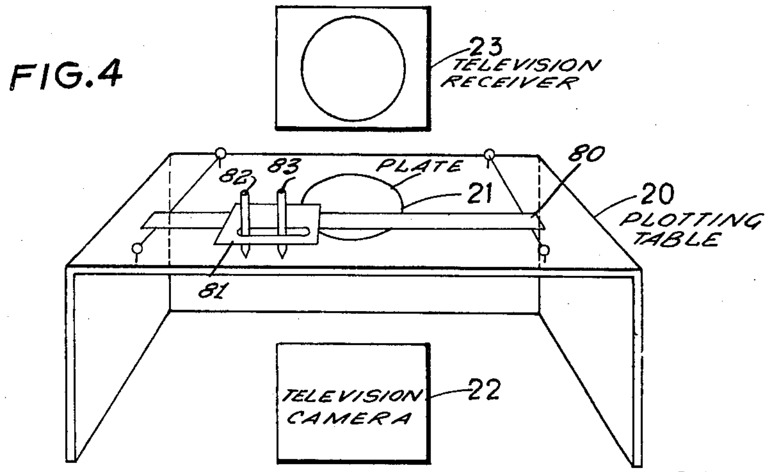
FIG. 4 is a perspective view of some of the components of the arrangement in FIG. 5.
Figure 5:
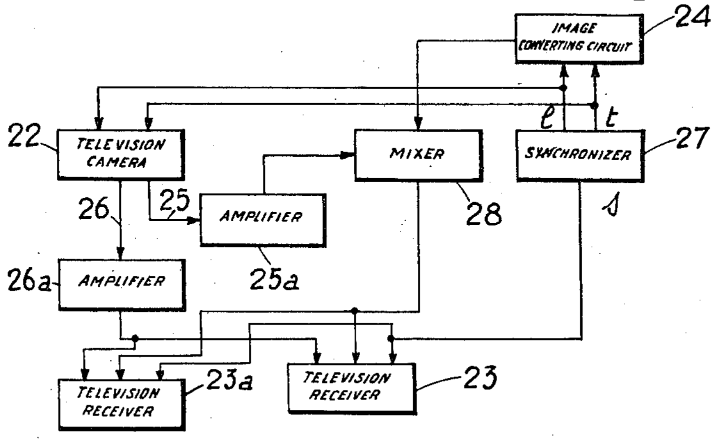
FIG. 5 illustrates an arrangement according to the invention as applied to a radar system comprising a bidimensional radar, and auxiliary means supplying a third co-ordinate of the detected objects.
Figure 6:
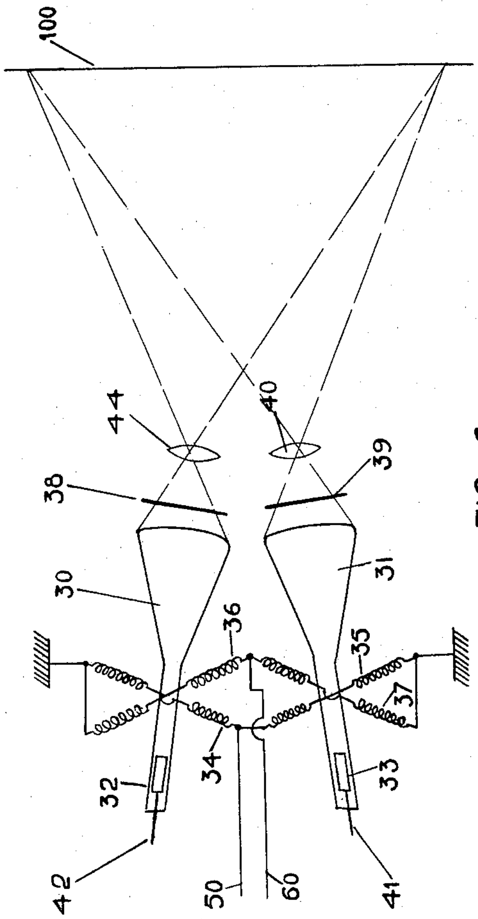
Figure 7:
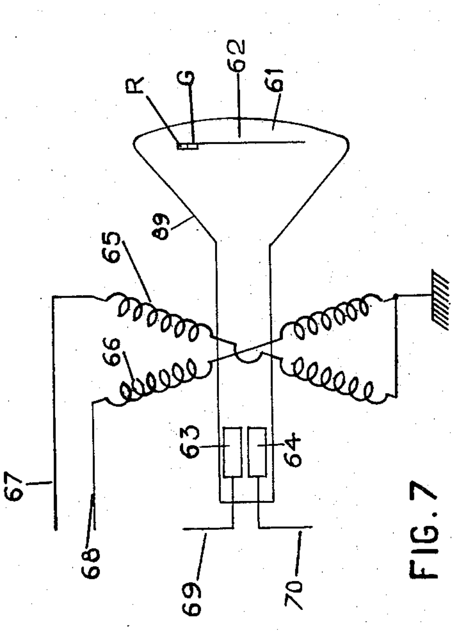

And FIGS. 6 and 7 illustrate two embodiments of the two image reproducing means of the television receivers used in the arrangements of FIGS. 2, 4 and 5.

Figure 1:
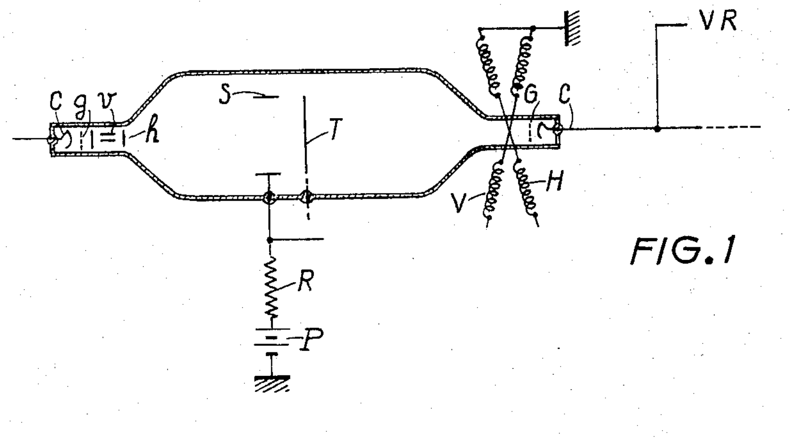
FIG. 1 is a diagrammatic view of an image transformer tube of known type.

FIG. 1 illustrates diagrammatically a two-gun, induced-conductivity, image converter tube, for example of the TMA 403 type, the vertical and horizontal deflection systems associated with the storing or writing gun being however built up by two pairs of stationary coils H and V. This tube comprises a storage target T, a reading gun represented schematically by its cathodes *c* and its control electrode *g*, pairs of horizontal and vertical deflection plates *h* and *v* associated with the reading gun, a collector electrode S, grounded through a resistance R and a positive polarization source P and the writing gun represented by its cathode C and its control electrode G.

The other components and connections of the tube are not necessary for understanding the description of the arrangement shown in FIG. 2 and are thereof not represented in the drawing.

Such a tube makes it possible to write on target T and electron image by means of the writing gun whose beam is modulated by the signal VR which is applied, for example, to the cathode C; the beam is deflected by coils H and V.

The repeated reading of the stored image may take place in the same way as the reading of the electron image appearing on the screen of a television camera, by means of the reading gun whose beam is deflected by plates *h* and *v*, the image video signal being collected at one terminal of the resistance R coupled to the collector electrode S.

FIG. 2 illustrates an arrangement according to the invention using two such tubes for obtaining a stereoscopic, televisual representation according to the invention.

In this figure, the two image converter tubes 1 and 2, which may be, for example, of the type shown in FIG. 1, have their components indicated by the same letter as in FIG. 1 followed by numerals 1 or 2, according to whether they belong to tube 1 or tube 2.

A radar image, assumed here by way of example, to be a range-bearing P.P.I. image is stored on target $T_1$.

To this end, the radar video signals VR are applied, as known in the art, to cathode $C_1$. Coils $H_1$ and $V_1$ are stationary and are fed in the same way as the stationary coils of a P.P.I., i.e., with saw-tooth signals $X_1$ and Y provided by a scanning voltage generator 3 which is controlled by the radar synchronization signal Sy and a signal corresponding to the bearing $\theta$. The generator delivers, at a third output, a signal A which energizes the control electrode $G_1$ during the useful scanning periods, i.e., outside the flyback periods.

According to the invention, tube 2 receives on its cathode $C_2$ the same signals VR as tube 1, coils $V_2$ being fed by the same saw-tooth signals Y as coils $V_1$ and the control electrode $G_2$ receiving the same signal A as the control electrode $G_1$.

A signal $\Delta l=kh$, where $k$ is a constant and $h$ the altitude signal provided by the three-dimensional radar, is added to the saw-tooth signal $X_1$ in a circuit 4, which provides a signal $X_2=X_1+\Delta l$, which is applied to coils $H_2$. (It is assumed herein that the deflection signals are expressed in units corresponding to the deflection produced on the screen.)

Signal $h$ may be provided, as is usually the case in three-dimensional radars, by a pulse synchronous with the video signal, and whose amplitude is proportional to the altitude. The signal $\Delta l=kh$ is added to $X_1$ in an adder of a conventional type.

Figure 3:
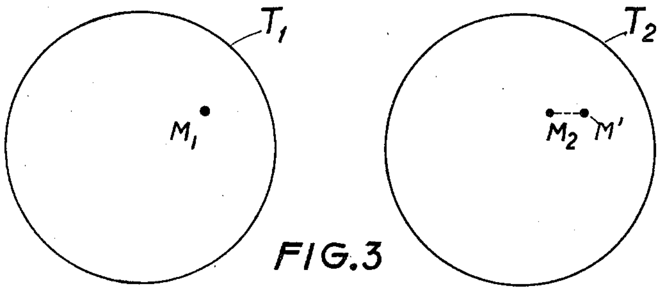
FIG. 3 illustrates the operation of the arrangement shown in FIG. 2.

The two images respectively stored on targets $T_1$ and $T_2$ will then have the relationship shown in FIG. 3.

Let point $M_1$ by the image on target $T_1$ of a point M from which an echo is reflected. The geometrical homologue of $M_1$ on $T_2$ being M′, the image $M_2$ of M will be positioned on target $T_2$ in such a manner that $M'M_2=\Delta l=kh$. Provided the sign of the constant $k$ is selected such that $M_2$ is shifted horizontally to the left with respect to M′, if $T_2$ is to the right of $T_1$ the two electron images on $T_1$ and $T_2$ are such that the corresponding optical images may be superposed to proivde a stereoscopic image.

Reverting to FIG. 2, the two electron images respectively appearing on targets $T_1$ and $T_2$ are read in synchronism and translated into television synchronous signals by means of a system including a television synchronization circuit 9, which feeds line and field blanking signals to a circuit 10 generating scanning saw-tooth signals $x$ and $y$, which correspond this time to a television scanning of targets $T_1$ and $T_2$. The saw-tooth signals $x$ are applied to the pairs of plates $h_1$ and $h_2$ and the saw-tooth signals $y$ are applied to the pairs of plates $v_1$ and $v_2$.

The image video signals collected on the collector electrodes $S_1$ and $S_2$ are respectively amplified in the amplifying arrangements 11 and 12.

The video signals collected at the output 13 and 14 of amplifiers 11 and 12 and deriving rsepectively from the televisual analysis of the electron images of $T_1$ and $T_2$ may be utilized for reproduction on a single screen of optical images corresponding to two different colors, for instances green and red.

To this end, the outputs 13 and 14 are coupled to the "green" and "red" inputs of a bi-chromatic television receiver 17, which also receives the line and field sychronization signals delivered by circuit 9.

The television receiver 17 may be of any known type adapted to provide a bichromatic image by means of the preceding signals.

It is obvious that a bichromatic or trichromatic receiver of the video monitoring type or of the type used for projection on a large-size screen, may be used.

It will suffice to use a pair of spectacles having one green and one red glass, to obtain a sense of depth in vision according to the well-known anaglyphic method. The resulting image may be viewed by several observers. Also several receivers 17 may be used simultaneously.

Instead of using two different colors to provide two different optical images, it is also possible to use differently polarized lights. To this end, a television receiver 17, of the projection type may be used, where the two tubes projecting the images on the projection screen are equipped with polarizing filters whose respective polarization directions are crossed. The observer will then use a pair of spectacles, the two glasses of which correspond respectively to these two filters.

Instead of forming the signal $X_2$ by adding the signal $X_1$ to the signal $\Delta l$, it is also possible to feed signal $X_1$ to coils $H_2$, the signal $\Delta l$ being applied to a pair of auxiliary horizontal deflection coils $H'_2$, with which tube $T_2$ can be easily provided. The signals $X_1$ and $\Delta l$ may also be mixed in coils $H_2$.

The arrangement shown in FIG. 2 may be readily adapted to the case where, instead of a three-dimensional radar, the source of primary signals is an antomatic device, comprising computers and storage devices which provides the three co-ordinates of the objects detected by a radar system.

In this case, circuit 3 is replaced by an amplifier circuit fed by said automatic device which provides, for a predetermined target, the continuous signals $X_1$ and Y corresponding to the co-ordinates of said target, circuit 4 receiving from the automatic device the corresponding altitude co-ordinate, and adding to signal $X_1$ the signal $\Delta l=kh$, so as to provide the continuous co-ordinate $X_2=X_1+\Delta l$.

FIG. 4 shows in perspective a portion of the arrangement of FIG. 5. It comprises a plotting table 20, the center 21 of which is a plate of a transparent material. Above this plotting table is located a television receiver 23 and below a television camera 22.

The object of the arrangement in FIG. 5 is the application of the invention to the case where in two coordinates, for example the bearing and the range, are directly supplied by a bidimensional radar. The third coordinate, for example the height *h*, is then obtained separately, e.g., by means of an elevation radar, and is used for a manual tracing on the plotting table.

A circuit 24, including an image transformer tube receives the signals from a bearing-range radar and provides at its output the video signals of the television image corresponding to the electron bearing-range image which is recorded on the tube screen. This circuit is identical to the portion of FIG. 2 inclusive of the output 13 of amplifier 11, which provides the video signals corresponding to the image recorded on screen $T_1$. However, in FIG. 5, the television synchronization circuit 27 has been shown separately from circuit 24. It corresponds to the synchronization circuit 9 of FIG. 2 and providing at its outputs *l* and *t* the line and frame blanking signals used for the generation of the scanning signals, and at its output *s* the line and frame synchronizing signals for the receiver.

Bi-chromatic camera 22, fitted with two pickup tubes, scans plate 21 shown in FIG. 4 and delivers at its outputs 25 and 26 the image video signals corresponding to the green and red components of said surface.

The synchronization circuit 27, common to the reading circuit of the image converting tube of circuit 24 and to the camera 22, synchronizes the reading scanning of the image converting tube and the scannings of the camera tubes so as to allow the monochrome electronic mixture of the television image provided by circuit 24 and of the green component image delivered by camera 22. Thus a double-univocal correspondence is established between point *m* of the target of the image converter tube and point $M_t$ of the plotting table, simultaneously scanned by the reading gun of the image converter tube and by the two tubes of the pick-up unit 22.

The "green" and "red" signals which appear at the outputs 25 and 26 of camera 22 are amplified in amplifiers **25*a* and 26*a***.

The output signals of amplifier **25*a* are mixed with the image signals provided by circuit 24 in a conventional mixer 28**.

The television receiver 23 is a receiver allowing the synthesis of a bi-chromatic image and may be of the same types as receiver 17 of FIG. 2.

The output signals of mixer 26 and amplifier **26*a* are respectively applied to the "green" and "red" inputs of receiver 23** which also receives the line and field synchronizing signals from the output *s* of the synchronization circuit 27.

The "green" image reproduced on the screen thus includes the televisual image supplied by circuit 24 and the marks made in green on the plotting table, whereas the red image includes only the marks made in red on this table.

There is also shown in FIG. 5 a second bi-chromatic receiver **23*a* which is fed in the same manner as receiver 23** and is assumed to serve in this example for transmitting the stereoscopic image to another user than the operator at the plotting table.

The stereoscopic display of a target M is then obtained manually as follows. The operator locates the point $M_{1t}$ of the plotting table corresponding to point $M_1$ of the television screen where this target is displayed in green, this being effected by means of a green marking on the plotting table which the operator sees appearing in this color on the television screen and which he displaces until it is superposed to point $M_1$.

Then he shifts, according to the direction corresponding on the table to the horizontal lines on the television screen, said point $M_{1t}$, for instance to the left, by a distance $M_{1t}\ M_{2t}=kh$, where *h* is the altitude of the corresponding target, this data being supplied to him in any desired manner, and records in red a dot on position $M_{2t}$, which is reproduced on the television screen through the "red channel," thus causing a stereoscopic display of point M to appear on the television screen.

In order to simplify the operation, there is preferably provided on table 20 a rule 80 adapted to be moved parallel to itself. The rule carries a slider 81 with one red and one green pencil respectively 83 and 82, in perpendicular relationship to the table. The green pencil 82 is stationary relative to the slider, whereas the red pencil 83 may be moved as a function of the spacing *kh*.

A stereoscopic display such as described hereinabove, may be used not only to cause the three co-ordinates of the targets to be "visualized," but also to better distinguish the useful signals from noise, since the eye is able to follow, at its "height level," an interesting echo amidst noise. It also allows a better visibility of the useful echoes, above the fixed echoes, on account of the difference in altitude between the first and the second.

The adjunction of marker lines of any type, also stereoscopically displayed, does not present any difficulty. In the arrangement of FIG. 5, it will suffice to draw such markers in green and in red, while taking account of the spacing proportional to the altitude at which it is desired to cause these markers to occur.

In the case of FIG. 2, the synthetic signals corresponding to the markers are mixed, respectively, to the signals delivered at the outputs of amplifiers 11 and 12, the signals mixed to the channel fed by amplifier 12 being shifted relative to those mixed to the channel fed by amplifier 11, according to the same law as the points representative of echoes, as a function of altitude at which it is desired to cause these markers to appear stereoscopically.

The stereoscopic visualization of such markers or synthetic signals presents great advantages if used, in particular, with a remote transmission of the image for the control of interceptions, for instrument landing systems or collision warning arrangements.

It is to be understood that the invention is not limited to the examples described and illustrated, many modifications and variations being within the reach of the skilled man.

Thus, the image converter tube described may be substituted by any other tube fulfilling the same functions.

The co-ordinate which is visualized stereoscopically by means of the device described is not necessarily the altitude: this may be, for instance, the range, in the case of a plane display in elevation-bearing.

The video signals obtained—image or synchronization signals—are not necessarily used to feed receivers of the video monitoring or projection type, for isntance, a carrier may be modulated by means of these signals according to known methods, for the remote transmission thereof.

Such a remote transmission of the radar signals, obtained by means of a three-dimensional radar for ground control approach, and of synthetic signals mixed, as indicated, with the radar signals, allows a stereoscopic display of the position of an aircraft inside an ideal landing path, to be presented to the aircraft crew.

The two images received may always, according to the preferred embodiment, be utilized at the receiver set for reproducing two optical images, differing in color or in the polarization plane of the light.

Instead of applying a shift $\Delta l$ to a single one of the two images representing an object, a shift $\Delta l/2$ may be applied to each one of the two images, one in one direction, the other in the opposite direction.

The circuit in FIG. 2 will then be modified by the adjunction, for the $X_1$ co-ordinate, of a circuit identical to circuit 4, and receiving, as the latter circuit, the altitude *h*.

This method is slightly more intricate than that described in detail hereinabove, but has the advantage to provide a stereoscopic view of the object, the projection of which on a horizontal plane (such as an observer may image when examining this image) is geographically exact, whereas, when applying a shift $\Delta l$ to a single one of the two images, an apparent shift equal to $\Delta l/2$ will be noted for the same projection.

This mode of operation may also be used in the case of the introduction of co-ordinates derived from an automatic storage system and in the case of the plotting table.

In the latter case the operator inscribes a green mark, and a red mark, with the proper spacing, respectively, on the two sides of point $M_{1t}$ corresponding to the location of a target as seen on receiver 23; the receiver 23*a* receives on its two inputs respectively the "green" and "red" signals delivered by camera 22, with the exclusion of the signals delivered by circuit 24 which are visualized solely on the receiver 23.

Receiver 23 is then only an auxiliary receiver, receiver 23*a* being the one providing a stereoscopic display.

FIG. 6 illustrates the two image reproducing means of a television receiver of the projection type. Two cathode ray tubes 30 and 31 are shown very schematically with their guns 32 and 33 to which respective video signals are applied by means of connections 42 and 41. Each tube has a pair of horizontal deflection coils, 34 and 35 respectively, and a pair of vertical deflection coils, 36 and 37 respectively, to which respective sweep voltages are applied by means of connections 50 and 60; the optical images formed by means of their respective luminescent bottoms are projected, by means of the optical systems 44 and 40, onto the same surface of a viewing screen 100.

Two optical filters 38 and 39 are inserted between tube 30 and optical system 41, and between tube 31 and optical system 40 respectively. Filters 38 and 39 may be crossed polarization filters, or a green and a red colour filter.

FIG. 7 schematically shows the two image reproducing means of a conventional receiver, using a single cathode ray tube 89, with a luminescent screen 62 having elements R and G (hands or dots) of red and green phosphors. Two such elements only have been shown on a very enlarged scale. With the red and green elements, two guns 63 and 64 are respectively associated, whose electron beams are swept over the screen and controlled so as to strike respectively the corresponding elements. The viewing screen is here luminescent screen 61, and the two images reproducing means are thus contained in a single tube.

The sweeping voltages are respectively applied to a pair of horizontal deflection coils 65 and a pair of vertical deflection coils 66, by means of connections 67 and 68. The video frequency signals are respectively applied to guns 63 and 64 by means of connection 69 and 70.

It will be readily appreciated that the arrangement of FIG. 6 is none other than that of a conventional three-tube receiver of the projection type, one tube of which has been eliminated.

In the same way, instead of a bichromatic tube 89, any conventional three-gun tube, with a tricolour luminescent screen, may be used, through disabling one of the guns.

What is claimed, is:

1. A stereoscopic display system for the representation of objects detected by a radar system supplying three coordinates of said objects, said stereoscopic display system comprising:
- at least one television receiver having a screen and a first and a second image reproducing means for the simultaneous production on said screen of a first and second picture of a nature to be perceived separately by means of an optical device;
- means for the production of a first and a second tracing, the combination of said tracings providing a stereoscopic representation of said objects according to said three coordinates;
- and a transmitting television circuit comprising: a first and a second channel respectively coupled to said first and second image reproducing means of said receiver; first means, including first analyzing means, for delivering to said first channel video signals representative of a television image of said first tracing; second means, including second analyzing means, for delivering to said second channel video signals representative of a television image of said second tracing; and means for synchronizing said first and second analyzing means.

2. A stereoscopic display system according to claim 1, wherein said receiver is a colour television receiver of the projection type, said first image reproducing means being means for reproducing said first picture in a first colour, and said second image reproducing means being means for reproducing said second picture in a second colour.

3. A stereoscopic display system according to claim 1, wherein said receiver is of the projection type and wherein said first and second image reproducing means respectively comprise two projecting tubes, and said tubes being equipped with polarization filters having crossed polarization directions.

4. A stereoscopic display system according to claim 1, wherein said "first and second channels are video-frequency channels having respective outputs, said first and second channel outputs being respectively coupled" to said receiver first and second reproducing means.

5. A stereoscopic display system for the presentation of objects detected by a radar system supplying three coordinates of said objects, said display system comprising:
- at least one television receiver having a viewing screen and first and second image producing means for the simultaneous production on said screen of a first and a second picture of a nature to be perceived separately by means of an optical device;

a first and a second image converter tubes having respective targets and respective reading means; means for writing respectively on said targets of said first and second image converter tubes, by means of the signals supplied by said radar system, respectively a first and a second electron tracing, the combination of said tracings providing a stereoscopic representation of said objects according to said three co-ordinates;

and a television transmitting circuit comprising: a first and second channel respectively coupled to said first and second reproducing image means of said receiver; first means, including said reading means of said first image converter tube, for delivering to said first channel video signals representative of a television image of said first tracing; second means, including said reading means of said second image converter tube, for delivering to said second channel video signals representative of a television image of said second tracing; and means for synchronizing said reading means of said first and second tubes.

6. A stereoscopic display system for the representation of objects detected by a radar system, comprising a bidimensional radar supplying two co-ordinates of said objects, and auxiliary means supplying a third co-ordinate of said objects, said display system comprising:

at least one television receiver having a viewing screen and first and second image reproducing means for the simultaneous production on said screen of a picture of a first color and a picture of a second color;

an image converter tube having a target and reading means;

means for writing on said target by means of the signals supplied by said bidimensional radar, an electron tracing, which is an undistorted representation of said objects according to the two co-ordinates supplied by said bidimensional radar;

a plotting table having a plate, and means for writing in said first and second color on said plate; said plotting table being located in the vicinity of said receiver;

and a television transmitting circuit comprising: a first and a second channel respectively coupled to said receiver first and second image reproducing means; a bichromatic camera including first and second analyzing means for scanning said plate; means for synchronizing the scannings of said reading means, and of said first and second analyzing means; means including said reading means, for generating video signals representative of a television image of said electron tracing; means, including said first analyzing means, for generating video signals representative of a television image of optical components of said first color appearing on said plate; means, including said second analyzing means, for delivering to said second channel video signals representative of a television image of optical components of said second color appearing on said table; means for mixing said video signals respectively representative of said television image of said tracing and of said television image of said components of said first color; and means for applying said mixed video television signals to said first channel.

7. A stereoscopic display system for the representation of objects detected by a radar system comprising a bidimensional radar supplying two co-ordinates of said objects, and auxiliary means supplying a third co-ordinate of said objects, said display system comprising:

an auxiliary television receiver having a screen and first and second image reproducing means for the simultaneous production on said screen of a picture of a first color and of a picture of a second color;

at least one other television receiver having a screen and first and second image reproducing means for the simultaneous production on said screen of said other receiver of a picture of said first color and a picture of said second color;

an image converter tube having a target and reading means;

means for writing on said target, by means of the signals supplied by said bidimensional radar, an electron tracing, which in an undistorted representation of said objects according to said two co-ordinates supplied by said bidimensional radar;

a plotting table having a plate, and means for writing in said first and said second color on said plate; said plotting table being located in the vicinity of said auxiliary receiver;

and a television transmitting circuit comprising: a first channel coupled to said first image reproducing means of said other receiver, a second channel coupled to said second image reproducing means of said other receiver and to said second reproducing means of said auxiliary receiver, and a third channel coupled to said first image reproducing means of said auxiliary receiver; a bichromatic camera having first and second analyzing means for scanning said plate; means for synchronizing the scannings of said reading means and of said first and second analyzing means; means, including said reading means, for generating video signals representative of a television image of said electron tracing; means, including said first analyzing means, for generating video signals representative of the optical components of said first color appearing on said plate; means for applying said last mentioned video signals to said first channel; means for mixing said video signals respectively representative of said television image of said electron tracing and of said television image of said components of said first color; means for applying said mixed signals to said third channel; and means, including said second analyzing means for delivering to said second channel video signals representative of a television image of the optical components of said second color appearing on said plate.

8. A transmitting system for the stereoscopic representation, by means of a television receiver comprising two image reproducing means, of objects detected by a radar system supplying three co-ordinates of said objects, said transmitting system comprising:

means for the production of a first and a second tracing, the combination of said tracings providing a stereoscopic representation of said objects according to said three co-ordinates;

and a television transmitter, said transmitter comprising a first and a second channel; first means, including first analyzing means, for delivering to said first channel video signals representative of a television image of said first tracing; second means, including second analyzing means, for delivering to said second channel video signals representative of a television image of said second tracing; means for synchronizing said first and second analyzing means; and means for the further transmission to said television receiver of said video signals delivered to said two channels.

9. A transmitting system for the stereoscopic representation, by means of a television receiver comprising two image reproducing means, of objects detected by a radar system supplying three co-ordinates of said objects, said transmitting system comprising:

a first and a second image converter tubes having respective targets and respective reading means; means for writing respectively on said targets of said first and second image converter tubes, by means of the signals supplied by said radar system, respectively and a first and a second electron tracing, the combination of said tracings corresponding to a stereoscopic representation of said objects according to said three co-ordinates;

and a television transmitting circuit comprising: a first and second channel; first means, including said reading means of said first image converter tube, for delivering to said first channel video signals representative of a television image of said first tracing; second means, including said reading means of said second image converter tube, for delivering to said second channel video signals representative of a television image of said second tracing; means for synchronizing said reading means of said first and second tubes; and means for the further transmission to said television receiver of said video signals delivered to said two channels.

10. A transmitting system for the stereoscopic representation of objects detected by a radar system, comprising a bidimensional radar supplying two co-ordinates of said objects, and auxiliary means supplying a third coordinate of said objects, said transmitting system comprising:

at least one television receiver having a viewing screen and first and second image reproducing means for the simultaneous production on said screen of a picture of a first color and a picture of a second color;

an image converter tube having a target and reading means;

means for writing on said target, by means of the signals supplied by said bidimensional radar, an electron tracing, which is an undistorted representation of said objects according to the two co-ordinates supplied by said bidimensional radar;

a plotting table having a plate, and means for writing in said first and second color on said plate; said plotting table being located in the vicinity of said receiver;

and a television transmitter comprising: a first and a second channel respectively coupled to said receiver first and second image reproducing means; a bichromatic camera including first and second analyzing means for scanning said plate; means for synchronizing the scannings of said reading means and of said first and second analyzing means; means including said reading means, for generating video signals representative of a television image of said electron tracing; means, including said first analyzing means, for generating video signals representative of a televison image of optical components of said first color appearing on said plate; means, including said second analyzing means, for delivering to said second channel video signals representative of a television image of optical components of said second color appearing on said table; means for mixing said video signals respectively representative of said television image of said tracing and of said television image of said components of said first color; means for applying said mixed video television signals to said first channel; and means for the further transmission of said video signals delivered to said two channels.

11. A transmitting system for the stereoscopic representation of objects detected by a radar system comprising a bidimensional radar supplying two co-ordinates of said objects, and auxiliary means supplying a third coordinate of said objects, said transmitting system comprising:

an auxiliary receiver having a screen and first and second image reproducing means for the simultaneous production on said screen of a picture of a first color and a picture of a second color;

an image converter tube having a target and reading means;

means for writing on said target, by means of the signals supplied by said bidimensional radar, an electron tracing, which is an undistorted representation of said objects according to said two co-ordinates supplied by said bidimensional radar;

a plotting table having a plate, and means for writing in said first and said second color on said plate; said plotting table being located in the vicinity of said auxiliary receiver;

and a television transmitter comprising: a first channel, a second channel coupled to said second image reproducing means of said auxiliary receiver, and a third channel coupled to said first image reproducing means of said auxiliary receiver; a bichromatic camera having first and second analyzing means for scanning said plate; means for synchronizing the scannings of said reading means and of said first and second analyzing means; means, including said reading means, for generating video signals representative of a television image of said electron tracing; means, including said first analyzing means, for generating video signals representative of the optical components of said first color appearing on said plate; means for applying said last mentioned video signals to said first channel; means for mixing said video signals respectively representative of said television image of said electron tracing and of said television image of said components of said first color; means for applying said mixed signals to said third channel; means, including said second analyzing means for delivering to said second channel video signals representative of a television image of the optical components of said second color appearing on said plate; and means for the further transmission of said video signals delivered to said first and second channels.

References Cited by the Examiner

UNITED STATES PATENTS

| | | | |
|---|---|---|---|
| 2,514,828 | 7/50 | Ayres | 178—6.5 |
| 2,637,023 | 4/53 | Peters | 178—6.5 |

DAVID G. REDINBAUGH, *Primary Examiner.*